United States Patent
Sawin et al.

(10) Patent No.: US 9,594,685 B2
(45) Date of Patent: Mar. 14, 2017

(54) CRITERIA FOR SELECTION OF DATA FOR A SECONDARY CACHE

(75) Inventors: James David Sawin, Sterling, MA (US); Luke W. Friendshuh, Elko, MN (US); Sumanth Jannyavula Venkata, Shakopee, MN (US); Ryan James Goss, Prior Lake, MN (US); Mark Allen Gaertner, Vadnais Heights, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 170 days.

(21) Appl. No.: 13/542,990

(22) Filed: Jul. 6, 2012

(65) Prior Publication Data

US 2014/0013052 A1    Jan. 9, 2014

(51) Int. Cl.
  *G06F 12/00*   (2006.01)
  *G06F 12/08*   (2016.01)
  *G06F 3/06*    (2006.01)

(52) U.S. Cl.
  CPC .......... *G06F 12/0862* (2013.01); *G06F 3/068* (2013.01)

(58) Field of Classification Search
  CPC ..................... G06F 12/0862; G06F 12/0811
  USPC ........................................................ 711/122
  See application file for complete search history.

(56) References Cited

U.S. PATENT DOCUMENTS

| | | | |
|---|---|---|---|
| 4,899,230 A | 2/1990 | Sherritt | |
| 5,274,768 A | 12/1993 | Traw et al. | |
| 5,420,998 A | 5/1995 | Horning | |
| 5,644,789 A | 7/1997 | Matthews et al. | |
| 6,339,811 B1 | 1/2002 | Gaertner et al. | |
| 6,549,992 B1 | 4/2003 | Armangau et al. | |
| 6,571,318 B1* | 5/2003 | Sander | G06F 12/0862 711/137 |
| 6,948,015 B2 | 9/2005 | Ogasawara et al. | |
| 6,976,147 B1* | 12/2005 | Isaac | G06F 12/0862 711/137 |
| 7,181,578 B1 | 2/2007 | Guha et al. | |
| 7,305,526 B2 | 12/2007 | Benhase et al. | |
| 7,613,876 B2 | 11/2009 | Bruce et al. | |
| 7,769,970 B1 | 8/2010 | Yeh et al. | |
| 7,836,259 B1* | 11/2010 | Filippo | G06F 12/0862 711/137 |
| 7,979,631 B2 | 7/2011 | Ahn et al. | |

(Continued)

OTHER PUBLICATIONS

Ahmadi et al., "A Cache Architecture for Counting Bloom Filters", 15th IEEE International Conference on Networks, 2007, pp. 218-223.

(Continued)

*Primary Examiner* — Prasith Thammavong
(74) *Attorney, Agent, or Firm* — Hollingsworth Davis, LLC

(57) ABSTRACT

Host read operations affecting a first logical block address of a data storage device are tracked. The data storage device includes a main storage and a non-volatile cache that mirrors a portion of data of the main storage. One or more criteria associated with the host read operations are determined. The criteria are indicative of future read requests of second logical block address associated with the first logical block address. Data of the at least the second logical block address is copied from the main storage to the non-volatile cache if the criteria meets a threshold.

17 Claims, 5 Drawing Sheets

(56) References Cited

U.S. PATENT DOCUMENTS

| | | |
|---|---|---|
| 7,996,642 B1 | 8/2011 | Smith |
| 8,015,360 B2 | 9/2011 | Hong et al. |
| 8,032,700 B2 | 10/2011 | Bruce et al. |
| 8,195,881 B2 | 6/2012 | Bohn et al. |
| 8,341,339 B1 | 12/2012 | Boyle et al. |
| 8,489,820 B1 | 7/2013 | Ellard |
| 8,583,879 B2 | 11/2013 | Na et al. |
| 2002/0002655 A1 | 1/2002 | Hoskins |
| 2002/0176430 A1 | 11/2002 | Sangha et al. |
| 2003/0105937 A1 | 6/2003 | Cooksey et al. |
| 2003/0105938 A1 | 6/2003 | Cooksey et al. |
| 2003/0105940 A1* | 6/2003 | Cooksey et al. ............ 711/203 |
| 2003/0196042 A1 | 10/2003 | Hopeman et al. |
| 2003/0200393 A1 | 10/2003 | Cornaby et al. |
| 2004/0123043 A1 | 6/2004 | Rotithor et al. |
| 2005/0108491 A1 | 5/2005 | Wong et al. |
| 2005/0114606 A1 | 5/2005 | Matick et al. |
| 2005/0172074 A1 | 8/2005 | Sinclair |
| 2006/0184949 A1 | 8/2006 | Craddock et al. |
| 2006/0248387 A1 | 11/2006 | Nicholson et al. |
| 2007/0022241 A1* | 1/2007 | Sinclair ............... 711/100 |
| 2007/0136523 A1 | 6/2007 | Bonella et al. |
| 2007/0250665 A1 | 10/2007 | Shimada |
| 2007/0288692 A1* | 12/2007 | Bruce et al. ............... 711/113 |
| 2008/0059694 A1 | 3/2008 | Lee |
| 2008/0162849 A1 | 7/2008 | Savagaonkar et al. |
| 2008/0209131 A1 | 8/2008 | Kornegay et al. |
| 2008/0288751 A1* | 11/2008 | Kocev ............... G06F 9/383 |
| | | 712/207 |
| 2009/0055595 A1 | 2/2009 | Gill et al. |
| 2009/0089501 A1* | 4/2009 | Ahn et al. ............... 711/113 |
| 2009/0106481 A1 | 4/2009 | Yang et al. |
| 2009/0157918 A1 | 6/2009 | Jin et al. |
| 2009/0193193 A1 | 7/2009 | Kern |
| 2009/0300628 A1 | 12/2009 | Patil et al. |
| 2010/0023682 A1 | 1/2010 | Lee |
| 2010/0095053 A1 | 4/2010 | Bruce et al. |
| 2010/0115172 A1 | 5/2010 | Gillingham et al. |
| 2010/0217952 A1 | 8/2010 | Iyer et al. |
| 2010/0325352 A1* | 12/2010 | Schuette et al. ............ 711/103 |
| 2011/0145489 A1 | 6/2011 | Yu et al. |
| 2012/0191936 A1 | 7/2012 | Ebsen et al. |
| 2012/0210041 A1 | 8/2012 | Flynn et al. |
| 2012/0266175 A1 | 10/2012 | Zheng |
| 2012/0311237 A1 | 12/2012 | Park |
| 2012/0317364 A1* | 12/2012 | Loh ............... 711/137 |
| 2013/0024625 A1 | 1/2013 | Benhase et al. |
| 2013/0179486 A1 | 7/2013 | Lee et al. |
| 2013/0191601 A1 | 7/2013 | Peterson et al. |
| 2013/0212319 A1 | 8/2013 | Hida et al. |
| 2013/0246688 A1 | 9/2013 | Kanno et al. |
| 2013/0268728 A1 | 10/2013 | Ramanujan et al. |
| 2013/0339617 A1 | 12/2013 | Averbouch et al. |
| 2014/0013025 A1 | 1/2014 | Venkata |
| 2014/0013026 A1 | 1/2014 | Venkata et al. |
| 2014/0013027 A1 | 1/2014 | Venkata et al. |
| 2014/0013047 A1 | 1/2014 | Sawin et al. |
| 2014/0013053 A1 | 1/2014 | Sawin et al. |
| 2014/0207997 A1 | 7/2014 | Peterson et al. |
| 2014/0241092 A1 | 8/2014 | Ha |
| 2014/0281134 A1 | 9/2014 | Eitan et al. |
| 2015/0033226 A1 | 1/2015 | Phelan et al. |
| 2015/0058525 A1 | 2/2015 | Venkata |
| 2015/0058526 A1 | 2/2015 | Venkata |
| 2015/0058527 A1 | 2/2015 | Venkata |
| 2015/0058683 A1 | 2/2015 | Venkata |

OTHER PUBLICATIONS

File History for U.S. Appl. No. 13/543,123.
File History for U.S. Appl. No. 13/543,303.
File History for U.S. Appl. No. 13/543,036.

* cited by examiner

CRITERIA FOR SELECTION OF DATA FOR A SECONDARY CACHE

SUMMARY

The present disclosure is related to systems and methods that facilitate determining criteria for selection of data for a non-volatile cache. In one embodiment, host read operations affecting a first logical block address of a data storage device are tracked. The data storage device includes a main storage and a non-volatile cache that mirrors a portion of data of the main storage. One or more criteria associated with the host read operations are determined. The criteria are indicative of future read requests of second logical block address associated with the first logical block address. Data of the at least the second logical block address is copied from the main storage to the non-volatile cache if the criteria meets a threshold.

These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to hybrid data storage devices, such as solid-state, hybrid, hard disk drives (HDDs). Generally, a hybrid HDD utilizes a combination of non-volatile, solid-state memory (e.g., flash memory) and conventional HDD media (e.g., magnetic disks) to provide performance approaching that of a solid-state drive (SSD), yet with the costs commonly associated with HDDs In the present disclosure, a hybrid drive architecture is described that uses an SSD as a non-volatile cache for HDD media, and is sometimes referred to as an HDD/SSD hybrid storage device. However, it will be appreciated that the concepts described herein may be applicable to any mixed-storage-media hybrid device that utilizes similar caching mechanisms.

An HDD/SSD hybrid drive combines features and technologies of conventional HDDs and SSDs. A hybrid drive may include a main store (e.g., one or more rotating magnetic disks), a volatile primary cache, and a non-volatile secondary cache. The primary cache may use a relatively small amount of volatile random access memory (RAM), while the secondary cache may uses a relatively large amount of non-volatile solid state memory that is kept coherent with the main store. The description below is directed to, among other things, a scheme for selecting data to be moved into the secondary cache. The scheme is intended to optimize performance under certain environments in which the drive may be highly/fully utilized, such as enterprise storage.

Figure 1:
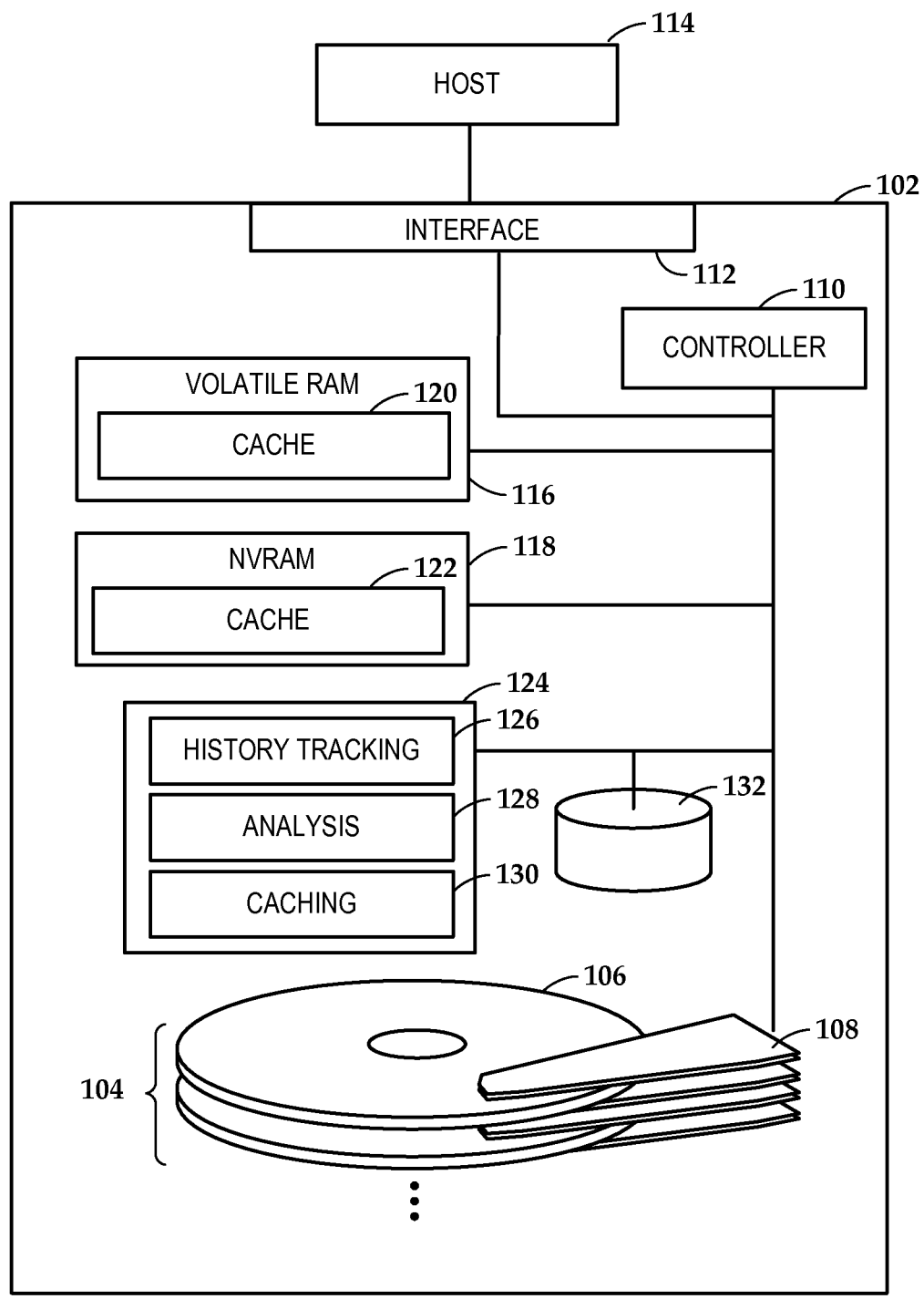
FIG. 1 is a block diagram of an apparatus according to an example embodiment.

In reference now to FIG. 1, a block diagram illustrates an apparatus 102 that includes caching features according to an example embodiment. The apparatus 102 includes main storage media 104 that, in this example, includes one or more magnetic disks 106. The disks 106 store data as magnetic patterns that are read by sensors (e.g., magnetic read/write sensors) mounted on a pivoting arm assembly 108. A controller 110 is coupled to the arm assembly and controls movement of the arm via an actuator (not shown). The controller 110 sends and receives signals (e.g., via encoder and decoder circuits) to/from one or more read/write heads on the arms, the signals ultimately being converted to data. While this embodiment shows a rotating magnetic storage media 106, the concepts described below may be applicable to alternate storage media.

The apparatus 102 includes a host interface 112 that communicatively couples the apparatus 102 to a host 114. The host interface 112 at least provides a mechanism that allows the host 114 to store and retrieve information to/from the main storage media 104. The host interface 112 may utilize standard communication interfaces and protocols, such as SATA, SCSI, eSATA, SAS, USB, etc. The host interface 112 provides both a standard means of communication between the apparatus 102 and host 114, as well as abstracting operations of the controller 110 and media 106. For example, the host 114 may access data by way of logical block addresses (LBAs) that are mapped internally to a different physical addressing scheme, e.g., based on cylinders, heads, and sectors.

The controller 110 may utilize various internal adaptations of the apparatus 102 to improve performance or otherwise provide efficient operation with the host 114. For example, the apparatus 102 may include a volatile random-access memory (RAM) 116, such as Dynamic-RAM (DRAM), and non-volatile RAM (NVRAM) 118, such as NAND flash memory. These memory devices 116, 118 may have a number of different uses, such as acting as temporary and permanent stores for data needed by the controller 110 during operation. The memory devices 116, 118 may also be used for caching host data, as represented by respective caches 120, 122.

Data retrieved from media 104 or stored to media 104 can be held in one or more caches 120, 122 to improve throughput. The caches 120, 122 have faster access and retrieval times than the media 104, although generally with less storage capacity. While there is some processing and data transfer overhead in using the one or more caches 120, 122, the faster media used by the cache can significantly improve overall performance of the apparatus 102 under many conditions.

In this configuration, the non-volatile cache 122 acts as a secondary cache, being faster but smaller than the main storage media 104. The volatile cache 120 is a primary cache, being faster but smaller than the non-volatile cache 122. Generally, the terms "primary" and "secondary" refer generally to an immediacy in time and priority to the host interface 112. For example, current read/write requests from the host 114 may be processed via the primary cache 120 to enable host commands complete quickly. Some of the data stored in the primary cache 120 may either be moved to the secondary cache 120 or synched up with the main store 104 as new requests come in.

The features discussed below for secondary caches may also be applicable in configurations where a non-volatile cache is not "secondary" in relation to other caches, such as where a non-volatile cache that is maintained in a parallel, non-hierarchical relation to a volatile cache, or used without a volatile cache at all. Similarly, the secondary cache may use volatile memory instead of non-volatile memory. In one configuration, non-volatile memory may be chosen as secondary cache media for cost considerations, and not for data retention upon power loss. As a result, the system may be configured not to store state information that allows recovery of the secondary cache should power be lost. In such a configuration, it may be possible to substitute volatile memory in place of the non-volatile memory without loss of functionality, because the data retention capability of the non-volatile memory is not being used.

The secondary cache 122 in this example may optionally be read-only, in that only data marked for read operations by the host 114 are placed in the secondary, non-volatile cache 122. In such a configuration, data marked for writing are sent directly to the main storage 104, either directly from the host interface 112 or via the primary, volatile cache 120. In some applications and configurations, it has been found that improvements in write speed using the NVRAM 118 instead of the main store 104 may not be sufficient to justify the overhead needed to track and sync write operations between the secondary cache 122 and main store 104.

The apparatus 102 includes functional modules 124 that perform various functions related to moving data in and out of the caches 120, 122. These modules 124 may include any combination of custom logic circuitry, general-purpose processors/controllers, firmware, and software. The modules 124 include a history tracking module 126 that tracks host operations affecting the data storage device, such as host read requests that are received over some period of time. The history tracking module 126 may be coupled to one or more of the host interface 112 and controller 110 in order to gather this data.

An analysis module 128 is configured to determine one or more criteria associated with the host operations. The criteria may be at least indicative of future read requests of certain logical block addresses, such as data that is not yet requested but has a likelihood of being requested in the future. The analysis module 128 may be coupled to the history tracking module to obtain this information. A caching module 130 is configured to cause data from the main storage 106 to be copied to the non-volatile cache 122 if a particular criterion meets a threshold. The caching module 130 may be coupled to at least the analysis module 128 to obtain the criterion, as well as being coupled to the main storage 104, controller 110, host interface 112, and caches 120, 122 to cause these transfers of data to the cache 122. Any combination of the history data, criteria, and current thresholds can be stored in a database 132 that is coupled to any of the modules 124, as well as being coupled to other components of the device 102.

One goal of the secondary cache design is to minimize access to the main storage for read operations that fall within particular access patterns. These patterns may identify some amount of data that is likely to be requested in the future, and which can be move to the secondary cache before it is requested. For example, some host data operations such as the reading of a commonly used file, may involve predictable data access patterns (e.g., sequential data reads over contiguous address ranges, repeated access to a particular range of addresses) and so may benefit from secondary caching. Other operations, such as benchmarking tests or updating random pages of virtual memory, may not benefit from secondary caching. For example, the overhead incurred in moving small blocks data in and out of the secondary cache may override any improvement in data transfer speed provided by the cache.

The embodiments described below may retrieve host-requested data from a secondary, non-volatile cache to avoid overhead in retrieving data from the main storage media. The data may be selected for storage into the secondary cache based on, among other things, a likelihood of being hit on a read request after a miss in the primary cache. As such, data in the secondary cache may be selected to avoid overlap with valid data on the primary cache. The data may also be selected so as to avoid data that can be predicted as conforming to a "raw" access pattern from the main store, e.g., 100% sequential or random reads. A 100% sequential read may be serviced nearly as efficiently from the main store, and/or may be the type of data that has low likelihood of being re-requested (e.g. streaming media). A 100% random read may also have low likelihood of LBAs being requested again, and so the overhead of caching large amounts of random LBAs may offset any benefit in the off-chance a previously requested LBA is requested again.

The embodiments described herein have features that may be configured for use under enterprise workloads. Computing resources of enterprise servers may be heavily utilized. For example, processors, disks, network interfaces, etc., of an enterprise server may be used at steady, relatively high activity levels for long periods of time. As this pertains to persistent data storage access, it has been found that for enterprise workloads, it may be better to cache read data than write data, and may also be better to cache speculative read data rather than requested read data.

One technique that may be employed to efficiently utilize the non-volatile, secondary cache is to determine a "cache importance metric" to be used as a criterion for whether data should be placed in the secondary cache. This may include data moved from the primary cache to the secondary cache and data moved directly from main storage to the secondary cache. The cache importance metric may use any combination of the following considerations: 1) frequency of recent host read requests for an LBA; 2) spatial distribution of recent host read LBA counts; 3) predicted disk access penalty for LBA cache miss; and 4) write frequency.

The first consideration noted above, frequency of requests, indicates regions in memory experiencing "hot," activity (e.g., recent, repeated accesses). Hot read activity can, by itself or in combination with other factors, indicate LBAs that may be more likely to be read again. Similarly, the second condition, spatial distribution, relates to how close in the LBA address space (e.g., "spatial locality") recent requests are grouped. Under some conditions, LBAs in or near recent active LBAs ranges may themselves be read in the future. The third condition, disk access penalty, relates to the characteristics of the architecture, such as particulars of the main data store. For example, if a frequently accessed range of LBAs is stored in physically diverse sectors on the main data store (e.g., belonging to a highly fragmented file), it may take longer to retrieve this than similarly accessed data that is stored in a contiguous range of physical sectors. Finally, the fourth consideration, write frequency, can identify data that is less likely to benefit from being in the secondary cache. For example, if the secondary cache only stores read data, the importance metric of an LBA may be reduced based on write activity targeted to the LBA.

Figure 2:
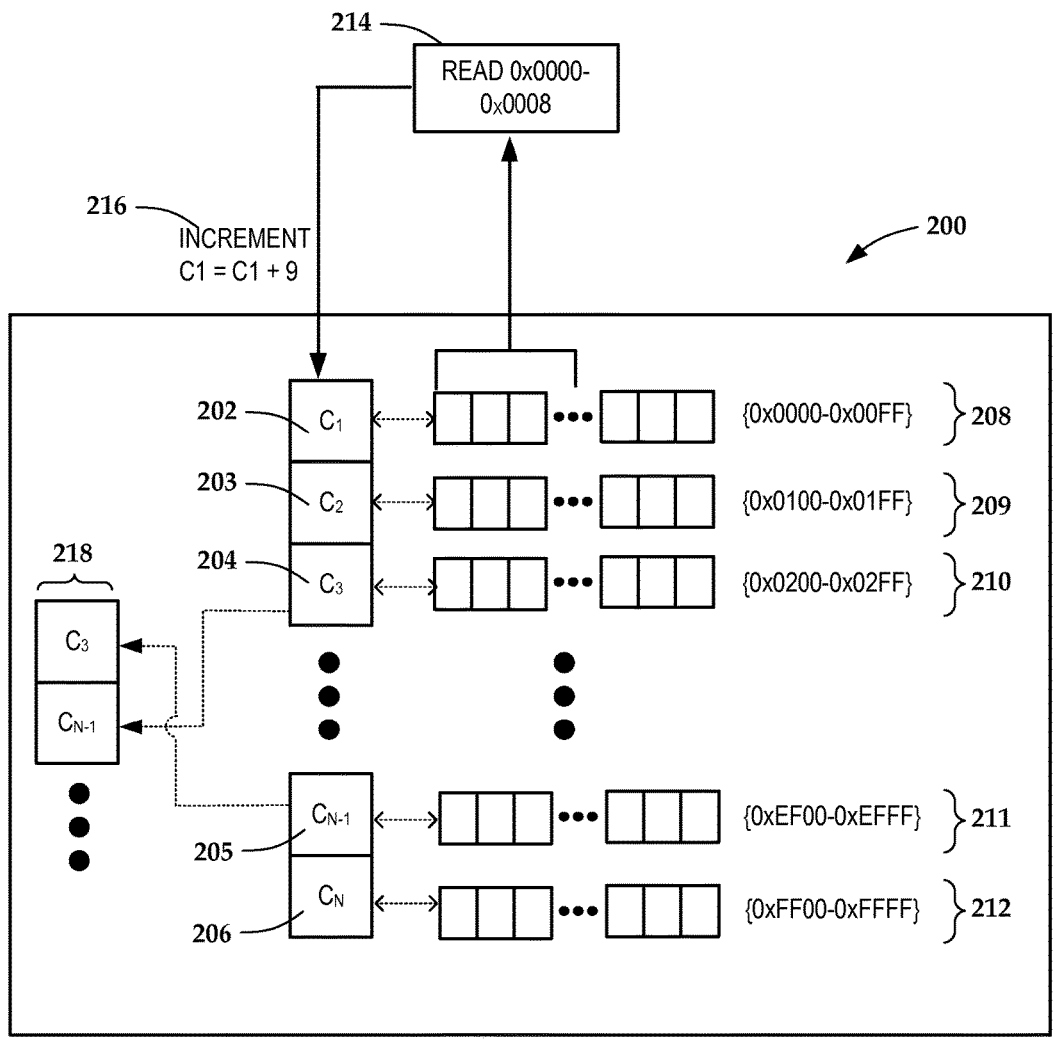
FIG. 2 is a block diagram illustrating a data structure for determining caching criteria for logical block address according to an example embodiment.

An example of determining at least the first and second considerations for particular LBA ranges is shown in the block diagram of FIG. 2. The block diagram illustrates aspects of what is referred to herein as a "zone table" 200. The zone table 200 includes data structures (e.g., table, list, map, set, array, etc.) usable to store a number of entries (e.g., entries 202-206). Each of the entries 202-206 is associated with a range of LBAs, e.g., ranges 208-212, respectively. The entries 202-206 store indicators (e.g., access operation counters) that indicate recent operations affecting the associated LBA ranges 208-212.

In this example, the entries 202-206 accumulate counts of host read requests targeted to the associated LBA ranges 208-212. For example, read request 214 affects a range of nine addresses within range 208, and so counter of entry 202 is incremented 216 by nine in response to the request 214 being fulfilled. The read request 214 may trigger incrementing 216 the count even if the requested LBAs are already stored in the secondary cache. For example, recent levels of activity on secondary cache data may be indicative that uncached neighboring LBAs (e.g., in an adjacent address range) might benefit from caching. Tracking continued activity for secondary cached ranges may also help determine whether those regions should remain in the cache. In the event some data needs to be ejected from the secondary cache, it may be preferable to eject cached data that has exhibited relatively lower levels of recent activity.

The size of the ranges 208-212 may be preconfigured before runtime or determined at runtime. The size of the ranges 208-212 may be set based on characteristics of the primary and/or secondary caches. For example, if the secondary cache organizes cached content into predetermined sized lines, it may be useful to match the size of the ranges 208-212 to the cache line size(s). In this way, cached lines may be treated as a unit in the zone table 200, being moved in and out of the secondary cache based on values of the counter entries 202-206.

Practical considerations may limit the choice of range sizes. For example, if too fine of a granularity is chosen, the zone table 200 might grow to be too large for the available memory. This a trade-off that may be considered when deciding whether to use a zone table 200 or a counting Bloom filter implementation as discussed below. When using a zone table 200, the zones may have relatively large-granularity (e.g., ~1 GB). Counting Bloom filters tend to provide high-granularity tracking using a relatively small amount of memory, while the zone table may perform better with medium-granularity tracking (e.g., on the order of the capacity of the secondary cache).

The caching importance metrics may be based on individual counter entries 202-205, and/or combinations of the counter entries 202-205. For example, activity that occurs on the boundary between two adjacent address ranges 208-212 may not indicate significant activity in either of the ranges compared to activity as a whole. However, if two adjacent ranges 208-212 are considered together in view of other adjacent ranges (e.g., sum of counters 202 and 203 compared to sum of counters 205-206) this may be enough to raise the cache importance metric of the adjacent ranges together as a unit.

A number of the zone table entries 202-206 with the highest counts (e.g., "hot" range of LBAs) may also be linked to a sorted list 218. The list 218 is sorted by access counts, so that "hotness" attributes can be determined quickly. A cache analysis module (e.g., module 128 shown in FIG. 1) may be able to access this list 218 to assign cache importance metrics to the address ranges 208-212, possibly in combination with other data, such as write request activity targeted to the ranges. The cache importance metric can trigger moving data from the ranges 208-212 in or out of the secondary cache (e.g., via caching module 130 in FIG. 1) if some threshold is met.

In response to some event, the entire zone table 200 may be decayed, e.g., by dividing all the counts in half. This avoids having the counters saturate their maximum values over time. This may also cause more recent activity to have a greater influence in the sorted list 218. The event that triggers the decay may include any combination of the passage of time, value of one more counter entries 202-206, the sum of the counter entries, etc. Assuming this decay is applied evenly, this should not affect the sorted list 218, because relative magnitude of the entries 202-206 should remain the same right after the entries are decayed. Some aspects of the entries 202-206 or list 218 may be stored elsewhere (e.g., database 132 in FIG. 1) before the entries 202-206 are adjusted. This enables longer term historical activity to be tracked and analyzed.

The zone table 200 enables determining "hot" zones, e.g., those that are accessed more than most other zones. High spatial locality is detected by the presence of hot zones within particular ranges 208-212 that are not cooling significantly due to recently activity. For example, any of the ranges 208-212 may exhibit brief bursts of high activity over time, but those that sustain high activity over larger time spans (or at least more recently) may be more indicative of spatial locality of the recent activity. The restriction of the activity to a particular range 208-212 (or combination of ranges) provides clues about spatially concentrated activity, which may increase cache importance for those ranges.

The use of a table 200 is only one example of how caching priority metrics may be determined. An alternate embodiment uses counting Bloom filters to track usage, and is shown in the block diagram of FIG. 3, which may be used instead of or in addition to the table mapping shown in FIG. 2. Generally, a Bloom filter is a data structure used to determine whether an element is a member of a set. The conventional Bloom filter may utilize a bit array, all elements of which are initialized to zero. Adding an element to the set involves applying k-hash functions to the element which results in k-bits of the array being set to one. Testing whether an element is a member of the set involves applying the same hash functions to the element, and testing whether all the resulting k-bits are already set to one. If at least one of the bits are not set to one, then the tested element is not in the set. A Bloom filter will always predict correctly if an element is not in a set, however there is a probability of a false positive, i.e., predicting that an element is in the set when it has not been added. The odds of a false positive can be minimized to an acceptable level by selecting Bloom filter parameters, such as the size of the bit array, the number of hashing functions, and the type of hashing functions.

In a conventional Bloom filter, an element cannot be removed from the filter. This is because two or more elements may set the same bit to one, and so changing a bit back to zero risks unintentionally removing other elements from the filter. To resolve this, a counting Bloom filter (CBF) uses an array of counters instead of a bit array to store the hash results. Adding an element to a CBF involves incrementing the counters for the k-hash results instead of changing a bit from zero to one. Checking whether an element is in the CBF set is similar to a conventional Bloom filter, in that each element is checked for a non-zero value for the k-hash value results. Unlike a conventional Bloom filter, an element can be removed in a CBF by decrementing the appropriate counters.

Figure 3:
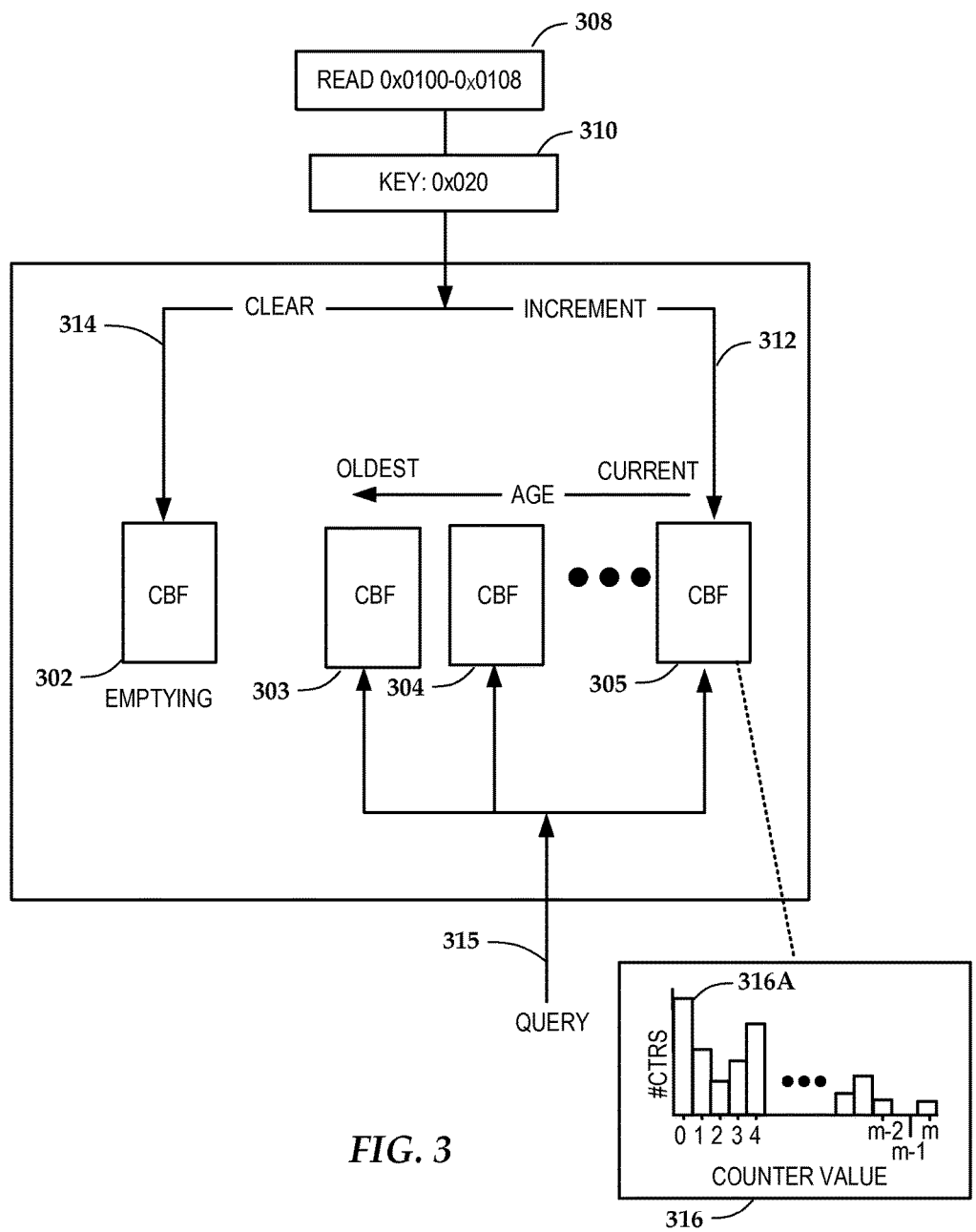
FIG. 3 is a block diagram illustrating a data structure for determining caching criteria for logical block address according to another example embodiment.

In FIG. 3, a collection of time ordered CBFs 302-305 are used to store keys 310 related to LBAs of incoming read requests 308. The key 310 may be an index of LBA ranges, such as an index associated with each of the ranges 208-212 shown in FIG. 2. The key 310 may be dynamically calculated, derived from a lookup, etc. For example, the key may be numeral ranging from value from zero to n−1 for n-LBA ranges. It will be appreciated that multiple keys 310 may be derived from a read request 308, such as where a request spans a range or ranges covered by two or more keys.

When first initialized, all CBFs 302-305 start off empty, and one is designated as the "current" CBF (e.g., CBF 305 in FIG. 3). The new key 310 is added to the current CBF 305 by incrementing 312 each of the counters of the CBF 305 according to the results of the hash values applied on the key 310. This incrementing 312 occurs so long as none of the incremented counters in the CBF 305 are at a maximum value. If so, then the CBF 305 may be move out of the current position, as described below.

When the current CBF 305 reaches a predefined fullness threshold (which may include a counter being at maximum, a total of the counters reaching a threshold, etc.), an empty CBF then becomes current. The fullness threshold may be defined as a maximum number of non-zero counts (e.g. 50% of CBF entries). Whenever the last remaining empty CBF is assigned as current, the oldest non-empty CBF is designated "emptying" (e.g., CBF 302 in FIG. 3). As each key is added by incrementing 312 the current CBF 305, the equivalent (or greater) number of unprocessed counters is cleared 314, if not already clear, in the emptying CBF 302.

A CBF is considered to be "active" if it is not empty and not emptying, e.g., CBFs 303-305 are active in this example. A key 310 is considered to be a member of the host read history if at least one active CBF 303-305 has a non-zero value for all of its hashed counters. A key 310 may also be used to query 315 the active CBFs 303-305, e.g., to see if an LBA or LBA range have exhibited recent activity.

As keys are added to the current CBF 305, a distribution 316 of hashed entry counts for that CBF may be updated. The hash entry distribution 316 tracks the number of hashed entry counters (vertical axis) in the current CBF with a specific count value (horizontal axis). The maximum value m on the horizontal axis may represent the maximum counter value, or some other threshold beyond which the CBF may be retired (e.g., 50% of maximum). The hash entry distribution 316 may be used to determine when the percentage of non-zero counts in the current CBF has exceeded the fullness threshold. Because the hash entry distribution 316 tracks the number of current CBF counts with a value of zero (value 316A), the number of non-zero counts is the total number of counts minus the number of zero counts 316A in the current CBF.

The hash entry distribution 316 may also be used to estimate spatial locality of host reads. When spatial locality is low, then the keys 310 added to the host read history are not repeated very often, and the corresponding hashed entries are evenly distributed. This may be expressed as a percentage (TP %) of non-zero count values that are less than a threshold (LCV). Exact definitions of TP and LCV can be tuned to the specific application. For example, low spatial locality may be defined if 95% of all non-zero hashed counts in the current CBF are less than three (TP %=95% and LCV=3).

The hash entry distribution 316 can give a first-order approximation of whether or not the most recent host reads have low spatial locality. An additional enhancement may be provided by looking not only at the current distribution, but at a distribution history that allows spatial locality trends to be spotted. The distribution history may be updated as each new key is added to the current CBF 305, and captures a partial snapshot of the hash entry distribution 316 at those times. The distribution history need not track a complete distribution of all count values over time, only those that are needed for the spatial locality computation. For example, only the total non-zero counts and the total non-zero counts <LCV may be tracked. A similar tracking of history may be performed with the sorted list 218 shown in FIG. 2.

Figure 4:
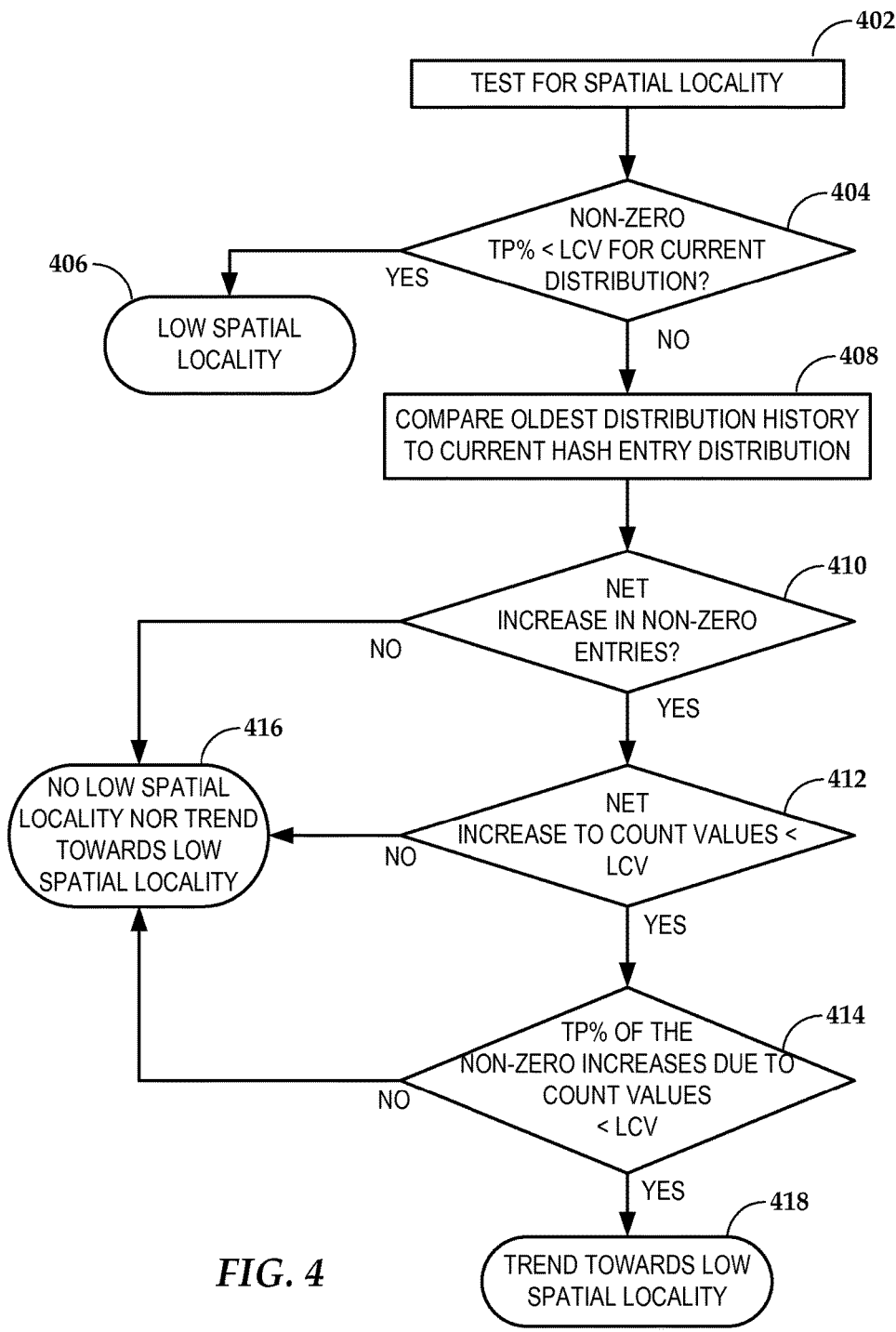
FIG. 4 is a flowchart illustrating a procedure to determine spatial locality using hash entry distribution history according to an example embodiment.

In FIG. 4, a flowchart illustrates an example of how spatial locality may be tested using hash entry distribution history according to an example embodiment. An event triggers a test 402 for low spatial locality, e.g., indicative that there is no closeness between LBA values associated with recent host operations. The test 402 can be triggered, for example, as a criterion for calculating a cache importance metric related to a range of LBAs. The cache importance metric may be evaluated on a regular schedule, in response to host data requests, in response to or preparation for a caching operation, etc.

The test 402 involves determining 404 whether the current hash entry distribution indicates that TP % non-zero count values are <LCV. If this determination 404 is true, then the output 406 of the procedure is low spatial locality. Otherwise, the oldest distribution history entry (or any combination of older histories) is compared 408 to the current hash entry distribution. Using this comparison, three determinations 410-412 are made.

The first determination 410 is whether there been additions causing a net increase in the number of non-zero entries. The second determination 411 is whether those net increases been to count values<LCV. The third determination 412 is whether TP % of the net increases to non-zero counts have been to count values<LCV. If the result of all three determinations 410-412 is "yes," then the output 418 of the procedure is a trend towards low spatial locality. If the result of any of the three determinations 410-412 is "no," there the output 416 of the procedure is that there is not low spatial locality, nor a trend toward it.

Figure 5A:
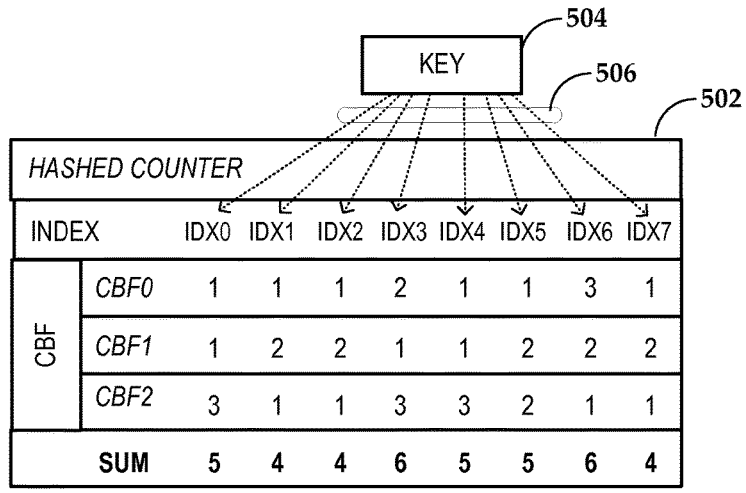
FIG. 5A is a table illustrating the calculation of counting Bloom filter sums according to an example embodiment.

The CBF arrangement shown in FIG. 3 may also be used to determine recent levels of activity, or "hotness." Hotness lookups can be performed on all active CBFs 303-305. The corresponding hashed counter values from all active CBFs 303-305 are summed to form the overall sequence of counter values for that key. For example, FIG. 5A shows a table 502 with CBF results for a particular key 504 according to an example embodiment. This example shows a row for each of three CBFs, numbered CBF0-CBF2. Each column in the table represents an index to a Bloom filter counter of the three CBFs. Each index is generated for eight hash functions 506 applied to the key 504. For example, if the CBF has 128 counters, each with an index from 0-127, the indices IDX0-IDX7 in table 502 may include 8, 27, 49, 55, 102, 112, 115, 120, each determined by performing the respective hash functions 506 on the key 504.

The bottom row in table 502 represents the sum of counters across each CBF for this key. In this example, all CBFs 0-2 are given the same weight, however in some implementations the most current active CBFs may be given a weight value that is higher than less recent active CBFs. In one variation, if any hash counter value for a given key is zero, then all counts for that CBF are set to zero. This is because a zero in any of the counters in rows 0-2 indicates the key has not been inserted into the CBF. For each key added, the minimum of the summed count values from all active CBFs is defined as the estimated repeat count (ERC) for that key. As keys are added, the ERC over all keys is tracked. In this example, ERC=4 for key 504, because that is the minimum count sum across all CBFs in the table 502 (lowest value of the SUM row in table 502). An alternate procedure for obtaining ERC may involve summing just the minimum value in each row of table 502. This alternate approach would yield ERC=3 for key 504, because the minimum value for each row is one.

The ERC derived as above may be used to determine read hotness. For example, three levels of hotness may be defined: 1. Cold (not present in CBFs); 2. Tepid (present in CBFs, but infrequently requested); and 3. Hot (present in CBFs, and frequently requested). Any combination of absolute and relative metrics may be used to determine this metric. For example, a key may be "cold" when ERC=0, and "hot" when ERC>$ERC_h$, $ERC_h$ being a predefined threshold that is tuned for the implementation. The key is "tepid" if 0>ERC≥$ERC_h$. In another example, the key may be considered "hot" when it falls within the top Nth-percentile of non-zero hash entry values up to the maximum ERC. Again, N is tuned for a particular implementation, and the key is "tepid" if above zero but below this percentile.

Figure 5B:
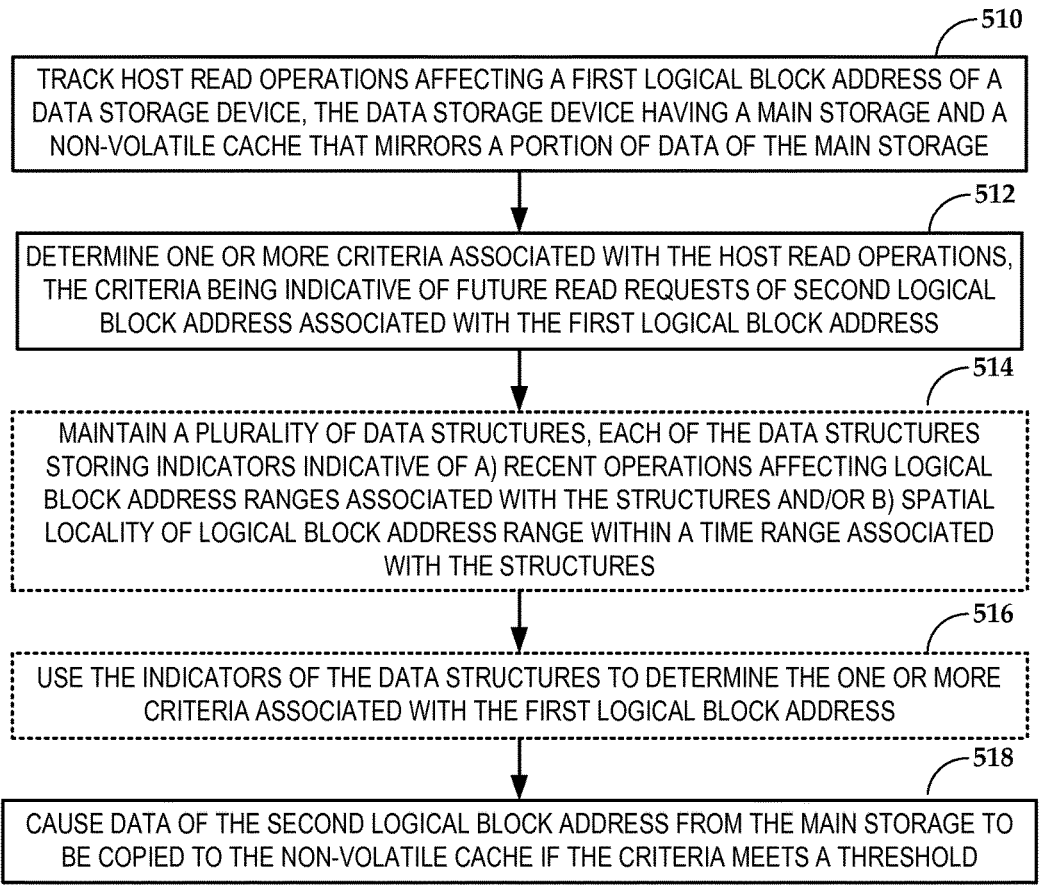
FIG. 5B is a flowchart of a procedure according to another example embodiment.

In reference now to FIG. 5B, a flowchart illustrates a procedure according to an example embodiment. The procedure involves tracking 510 host read operations affecting a first logical block address of a data storage device. The data storage device has a main storage and a secondary cache that mirrors a portion of data of the main storage. One or more criteria associated with the host read operations are determined 512.

The criteria determined at 512 is indicative of future read requests of second logical block address associated with the first logical block address. This criteria may be used to cache the second address in a non-volatile (e.g., secondary) cache if the criteria meets a threshold. The criteria may be indicative of a recent proximity in time of the host read operations and/or a closeness of address values of the host read operations. In one arrangement, the non-volatile cache stores read-only data. In such a case, an importance of the criteria is reduced based on write activity associated with the first logical block address.

In another example, the procedure may optionally involve maintaining 514 a plurality of data structures storing indicators. Each of the data structures may store indicators of one or more of A) recent operations affecting LBAs associated with the structures (e.g., zone table as shown in FIG. 2) and/or B) spatial locality of LBAs within a time range associated with the data structures (e.g., CBFs shown in FIG. 3). The indicator(s) determined at 514 may optionally be used to determine 516 the criteria associated with the first logical block address. Finally, data of the at least the second logical block address from the main storage is copied 518 to the non-volatile cache if the criteria meets a threshold.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing error recovery in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
a processor configured to:
track host read operations affecting a first logical block address of a data storage device, the data storage device comprising a main storage and a non-volatile cache that stores read-only data and mirrors a portion of data of the main storage;
determine criteria associated with the host read operations, the criteria being indicative of future read requests of a second logical block address associated with the first logical block address and wherein an importance of the criteria is reduced based on write activity associated with the first logical block address; and
cause data of at least the second logical block address from the main storage to be copied to the non-volatile cache if the criteria meets a threshold.

2. The apparatus of claim 1, wherein the criteria is indicative of a recent proximity in time of the host read operations.

3. The apparatus of claim 1, wherein the criteria is indicative of a closeness of address values of the host read operations.

4. The apparatus of claim 1, wherein the importance of the criteria is increased based on a predicted main store access penalty resulting from a secondary cache miss in response to a request for the second logical block address.

5. The apparatus of claim 1, wherein the processor is further configured to maintain a plurality of data structures each associated with a logical block address range, wherein each of the data structures stores indicators indicative of the recent operations affecting the associated logical block address range, the indicators used to determine the criteria associated with the first logical block address.

6. The apparatus of claim 1, wherein the processor is further configured to maintain a plurality of data structures each associated with a time range, wherein each of the data structures stores indicators indicative of spatial locality of a logical block address range, the indicators used to determine the criteria associated with the first logical block address.

7. The apparatus of claim 1, wherein the main storage comprises a magnetic disk media and the non-volatile cache comprises a non-volatile, solid-state memory.

8. A method, comprising:
tracking host read operations affecting a first logical block address of a data storage device, the data storage device comprising a main storage and a non-volatile cache that stores read-only data and mirrors a portion of data of the main storage;

determining criteria associated with the host read operations, the criteria being indicative of future read requests of a second logical block address associated with the first logical block address and wherein an importance of the criteria is reduced based on write activity associated with the first logical block address; and causing data of at least the second logical block address from the main storage to be copied to the non-volatile cache if the criteria meets a threshold.

9. The method of claim 8, wherein the criteria is indicative of a recent proximity in time of the host read operations.

10. The method of claim 8, wherein the criteria is indicative of a closeness of address values of the host read operations.

11. The method of claim 8, wherein the importance of the criteria is increased based on a predicted main store access penalty resulting from a secondary cache miss in response to a request for the second logical block address.

12. The method of claim 8, further comprising maintaining a plurality of data structures each associated with a logical block address range, wherein each of the data structures stores indicators indicative of the recent operations affecting the associated logical block address range, the indicators used to determine the criteria associated with the first logical block address.

13. The method of claim 8, further comprising maintaining a plurality of data structures each associated with a time range, wherein each of the data structures stores indicators indicative of spatial locality of logical block address range, the indicators used to determine the criteria associated with the first logical block address.

14. An apparatus, comprising:
a main storage;
a secondary non-volatile cache that stores read-only data and mirrors a portion of data of the main storage;
a host interface configured to couple the apparatus to a host; and
a processor coupled to the main storage, the secondary non-volatile cache, and the host interface, the processor configured to:
track read operations of the host interface, the read operations affecting a first logical block address;
determine criteria associated with the read operations, the criteria being indicative of future read requests of a second logical block address associated with the first logical block address and wherein an importance of the criteria is reduced based on write activity associated with the first logical block address; and
cause data of at least the second logical block address from the main storage to be copied to the secondary non-volatile cache if the criteria meets a threshold.

15. The apparatus of claim 14, wherein the criteria is indicative of at least one of a recent proximity in time of the host read operations and a closeness of address values of the host read operations.

16. The apparatus of claim 14, wherein the processor further maintains a plurality of data structures each associated with a logical block address range, wherein each of the data structures stores indicators indicative of the recent operations affecting the associated logical block address range, the indicators used to determine the criteria associated with the first logical block address.

17. The apparatus of claim 14, wherein the processor further maintains a plurality of data structures each associated with a time range, wherein each of the data structures stores indicators indicative of spatial locality of a logical block address range, the indicators used to determine the criteria associated with the first logical block address.

* * * * *